United States Patent
Babakhani

(10) Patent No.: US 10,526,884 B2
(45) Date of Patent: Jan. 7, 2020

(54) SYSTEMS AND METHODS FOR MONITORING CEMENT QUALITY IN A CASED WELL ENVIRONMENT WITH INTEGRATED CHIPS

(71) Applicant: WILLIAM MARSH RICE UNIVERSITY, Houston, TX (US)

(72) Inventor: Aydin Babakhani, Houston, TX (US)

(73) Assignee: William Marsh Rice University, Houston, TX (US)

(*) Notice: Subject to any disclaimer, the term of this patent is extended or adjusted under 35 U.S.C. 154(b) by 160 days.

(21) Appl. No.: 15/327,911

(22) PCT Filed: Jul. 31, 2015

(86) PCT No.: PCT/US2015/043117
§ 371 (c)(1),
(2) Date: Jan. 20, 2017

(87) PCT Pub. No.: WO2016/019247
PCT Pub. Date: Feb. 4, 2016

(65) Prior Publication Data
US 2017/0204719 A1    Jul. 20, 2017

Related U.S. Application Data

(60) Provisional application No. 62/032,164, filed on Aug. 1, 2014.

(51) Int. Cl.
*E21B 47/00* (2012.01)
*E21B 33/14* (2006.01)
(Continued)

(52) U.S. Cl.
CPC .......... *E21B 47/0005* (2013.01); *E21B 33/14* (2013.01); *G01V 1/46* (2013.01); *G01V 3/30* (2013.01); *G01V 3/34* (2013.01)

(58) Field of Classification Search
CPC ....... E21B 47/0005; E21B 33/14; G01V 3/34; G01V 3/30; G01V 1/46; G01N 33/383
See application file for complete search history.

(56) References Cited

U.S. PATENT DOCUMENTS

| 4,800,537 A | 1/1989 | Mount, II |
| 5,381,694 A | 1/1995 | Glynn et al. |

(Continued)

FOREIGN PATENT DOCUMENTS

| WO | WO-2015048249 A1 | 4/2015 |
| WO | WO-2015105546 A2 | 7/2015 |

(Continued)

OTHER PUBLICATIONS

International Search Report and Written Opinion for PCT/US2015/043117, dated Nov. 27, 2015.
(Continued)

*Primary Examiner* — Michael R Wills, III
(74) *Attorney, Agent, or Firm* — Winstead PC

(57) ABSTRACT

A well monitoring system may provide a plurality of integrated chips dispersed in cement surrounding a well casing. Each of the integrated chips may provide energy harvesting circuitry, EM transceiver, modulator, additional sensor(s), processor or microprocessor, memory, power source, or the like. Upon analyzing data gather from the sensor(s), emitted and detected EM waves, the system may provide information about the cement thickness at different parts of the well, cement setting/curing, local electrical permittivity, local magnetic permeability, temperature, pressure, pH, local NMR spectrum, local ESR spectrum, local florescence response, local porosity, local permeability, etc. Further, the integrated chips may be utilized to transmit/receive the abovementioned data, other data (e.g. command data, power signal, etc.), or the like to/from the main transceiver.

28 Claims, 2 Drawing Sheets

(51) Int. Cl.
*G01V 3/34* (2006.01)
*G01V 3/30* (2006.01)
*G01V 1/46* (2006.01)

(56) References Cited

U.S. PATENT DOCUMENTS

| | | | |
|---|---|---|---|
| 6,018,496 A * | 1/2000 | Stanke | E21B 47/0005 181/105 |
| 6,023,170 A | 2/2000 | Hilhorst et al. | |
| 6,041,861 A | 3/2000 | Mandal et al. | |
| 6,408,943 B1 * | 6/2002 | Schultz | E21B 7/061 166/250.01 |
| 6,976,535 B2 | 12/2005 | Aronstam et al. | |
| 7,082,993 B2 | 8/2006 | Ayoub et al. | |
| 7,424,911 B2 | 9/2008 | McCarthy et al. | |
| 7,602,668 B2 | 10/2009 | Liang et al. | |
| 8,072,220 B2 | 12/2011 | Dolgin et al. | |
| 8,168,570 B2 | 5/2012 | Barron et al. | |
| 8,253,417 B2 | 8/2012 | Pislak et al. | |
| 8,269,501 B2 | 9/2012 | Schmidt et al. | |
| 8,397,810 B2 | 3/2013 | Verret et al. | |
| 8,683,707 B1 | 4/2014 | Horton, Jr. | |
| 8,841,914 B2 | 9/2014 | Qu et al. | |
| 9,062,539 B2 | 6/2015 | Schmidt et al. | |
| 9,063,252 B2 | 6/2015 | Kamal et al. | |
| 9,097,097 B2 | 8/2015 | DiFoggio et al. | |
| 9,187,993 B2 | 11/2015 | Schmidt et al. | |
| 9,394,785 B2 | 7/2016 | Goodwin et al. | |
| 9,494,032 B2 | 11/2016 | Roberson et al. | |
| 9,532,118 B2 | 12/2016 | Vuran et al. | |
| 10,048,073 B2 | 8/2018 | Dolgin et al. | |
| 10,287,877 B2 | 5/2019 | Gianchandani et al. | |
| 10,349,249 B2 | 7/2019 | Akyildiz et al. | |
| 2002/0000808 A1 | 1/2002 | Nichols | |
| 2004/0100280 A1 | 5/2004 | Ju et al. | |
| 2009/0211754 A1 * | 8/2009 | Verret | E21B 47/10 166/250.12 |
| 2010/0117488 A1 | 5/2010 | Wang et al. | |
| 2011/0163857 A1 | 7/2011 | August et al. | |
| 2011/0186290 A1 | 8/2011 | Roddy et al. | |
| 2012/0273192 A1 | 11/2012 | Schmidt et al. | |
| 2013/0328693 A1 | 12/2013 | Mohamadi | |
| 2014/0091802 A1 | 4/2014 | Yang et al. | |
| 2014/0097842 A1 | 4/2014 | Yang et al. | |
| 2014/0111349 A1 * | 4/2014 | Roberson | E21B 47/122 340/854.8 |
| 2016/0223478 A1 | 8/2016 | Babakhani et al. | |
| 2016/0223669 A1 | 8/2016 | Assefzadeh et al. | |
| 2017/0204721 A1 | 7/2017 | Babakhani | |

FOREIGN PATENT DOCUMENTS

| | | |
|---|---|---|
| WO | WO-2015134705 A2 | 9/2015 |
| WO | WO-2016187300 A1 | 11/2016 |

OTHER PUBLICATIONS

International Preliminary Report on Patentability for PCT/US2015/043117, dated Feb. 16, 2017.

"Wireless underground sensor networks: Research challenges", Ian F. Akyildiz, Erich P. Stuntebeck, Ad Hoc Networks 4 (2006) 669-686.

* cited by examiner

SYSTEMS AND METHODS FOR MONITORING CEMENT QUALITY IN A CASED WELL ENVIRONMENT WITH INTEGRATED CHIPS

RELATED APPLICATIONS

This application claims the benefit of U.S. Provisional Patent Application No. 62/032,164, filed on Aug. 1, 2014, which is incorporated herein by reference.

FIELD OF THE INVENTION

This invention relates to systems and methods for monitoring cement quality in a cased well environment via integrated chips. More specifically, the integrated chips may emit and/or detect electromagnetic waves that allow surrounding materials to be analyzed.

BACKGROUND OF INVENTION

A common practice when operating a well is the use of casing in a wellbore. Casing is pipe lowered into a borehole, which is typically cemented in place. Casing joints are often fabricated with male and female threads on each end that allow the individual joints of casing to be joined together. A well designer may design casing to withstand a variety of forces, such as collapse, burst, and tensile failure, as well as chemically aggressive brines. Casing is utilized for a variety of reason, such as protecting fresh water formations, isolating a zone of lost returns, isolating formations with significantly different pressure gradients, preventing unstable upper formations from caving-in and sticking the drill string or forming large caverns, providing a strong upper foundation to use high-density drilling fluid to continue drilling deeper, isolating different zones, sealing off high pressure zones from the surface, avoiding potential for a blowout, and the like.

After a well is drilled and metal casing is placed, cement is pumped to the well to fill the spacing between the casing and the formation. Cement provides mechanical support for the casing and keeps different formation layers isolated. This is a very important step, which prevents various fluid types (e.g. water and oil) in the reservoir to be mixed with each-other. The isolation between various formation layers is a critical aspect of well integrity tests to ensure hydrocarbon production in a safe manner. Cement evaluation measurements may be routinely done to check the bonding between the cement and the metal casing. In some techniques, a transmitter inside the well transmits sonic or ultrasonic waves to the internal wall of the casing. The waves or signal travels through the casing wall and gets reflected from the casing-cement boundary. By analyzing the phase and amplitude of the reflected signals, the bonding quality between the casing and the cement can be determined. However, this technique is limited to providing information on the bonding quality, and does not provide any information about the cement itself such as its thickness or the level of setting (e.g. the level of solidness). Thus, there is a need for systems and methods that utilize integrated chips that emit and/or detect electromagnetic waves that allow surrounding materials to be analyzed.

SUMMARY OF INVENTION

In one embodiment, a well monitoring system may provide a plurality of integrated chips dispersed in cement surrounding a well casing. Each of the integrated chips may provide energy harvesting circuitry, EM transceiver, modulator, additional sensor(s), processor or microprocessor, memory, power source, or the like. Upon analyzing data gather from the sensor(s), emitted and detected EM waves, the system may provide information about the cement thickness at different parts of the well, cement setting/curing, cracks inside the cement, local porosity, local permeability, local electrical permittivity, local magnetic permeability, temperature, pressure, pH, local NMR spectrum, local ESR spectrum, local florescence response, gas leaks such as methane, $CO_2$, and $H_2S$, etc. Further, the integrated chips may be utilized to transmit/receive the abovementioned data, other data (e.g. command data, power signal, etc.), or the like to/from the main transceiver.

The foregoing has outlined rather broadly various features of the present disclosure in order that the detailed description that follows may be better understood. Additional features and advantages of the disclosure will be described hereinafter.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
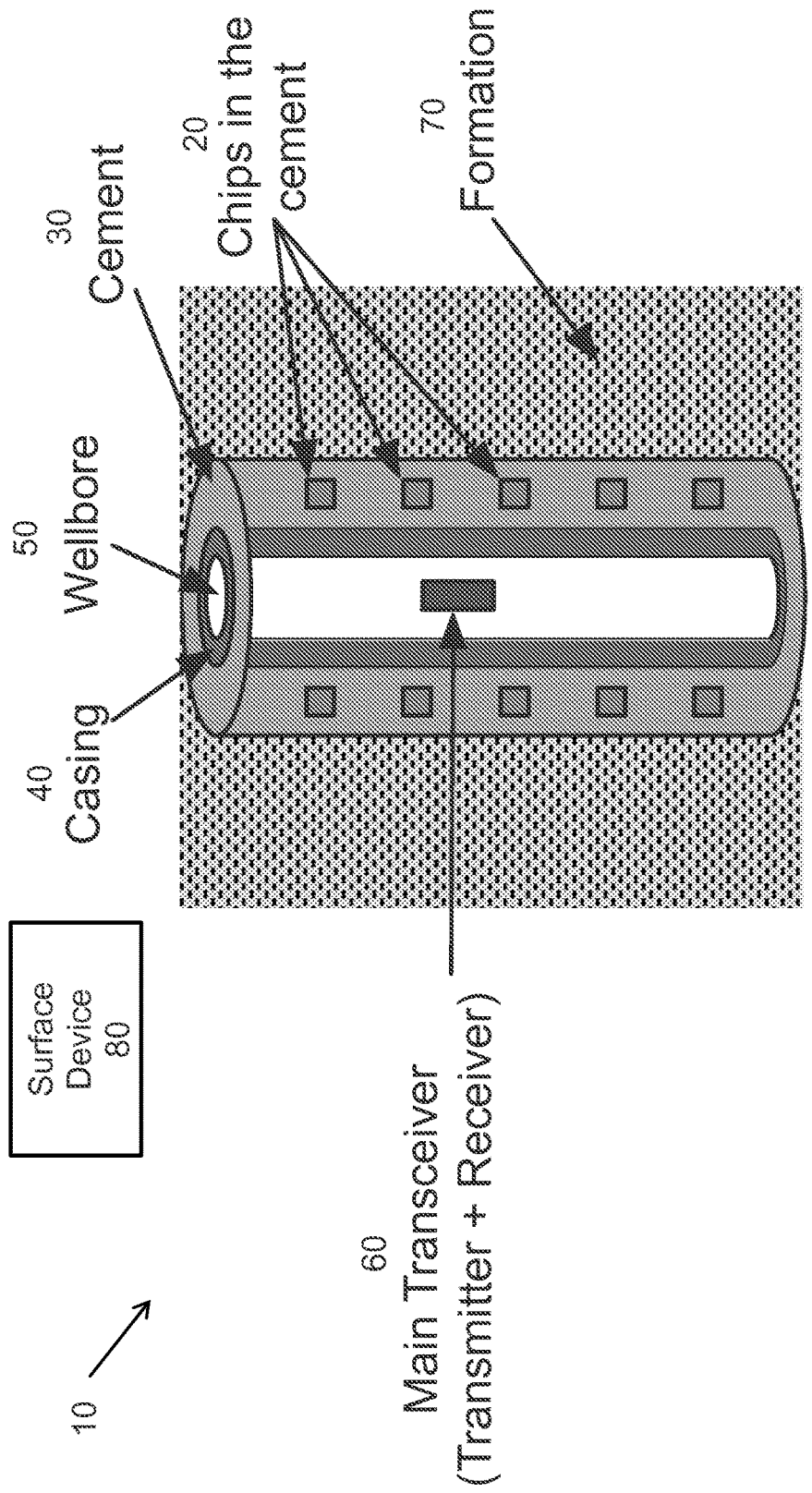
FIG. 1 is an illustrative embodiment of a well monitoring system providing integrated chips dispersed in cement surrounding a well casing.

Refer now to the drawings wherein depicted elements are not necessarily shown to scale and wherein like or similar elements are designated by the same reference numeral through the several views.

Referring to the drawings in general, it will be understood that the illustrations are for the purpose of describing particular implementations of the disclosure and are not intended to be limiting thereto. While most of the terms used herein will be recognizable to those of ordinary skill in the art, it should be understood that when not explicitly defined, terms should be interpreted as adopting a meaning presently accepted by those of ordinary skill in the art.

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

Well monitoring systems and methods disclosed herein propose a fundamentally different technique for monitoring a well. FIG. 1 is an illustrative embodiment of a well monitoring system 10 providing integrated chips (ICs) 20 dispersed in cement 30 surrounding a well casing 40. In some embodiments, the ICs 20 may be chips fabricated with integrated circuit technology. In some embodiments, the ICs 20 may be miniaturized (<mm$^3$) chips that are permanently embedded inside the cement 30 surrounding the well casing 40. These ICs 20 may measure the electromagnetic complex permittivity of their surrounding materials by emitting and detecting electromagnetic waves. In some embodiments, the ICs 20 may also transmit and/or receive sonic or ultrasonic waves. Based on the transmitted and reflected waves, electrical and magnetic properties of the surrounding materials can be determined or calculated, thereby allowing the surrounding materials to be identified. As a nonlimiting example, it is expected that due to the high absorption of water, the imaginary part of the complex permittivity of the cement changes (decreases) during the setting/curing process, thereby allowing detection of what stage the cement is at during a setting/curing process. This change is significant in the frequencies above 500 MHz.

Within the internal bore 50 of the casing 40 a main transceiver 60 may be provided. The main transceiver 60 may be coupled to other downhole tools as part of a tool string or may be deployed separately from other downhole tools. The main transceiver 60 may comprise a transmitter, receiver, power source, processor, memory, analog to digital convertor (ADC), digital to analog convertor (DAC), or a combination thereof. The main transceiver 60 may use sonic waves, ultrasonic waves or low-frequency electromagnetic waves to communicate with the chips 20 inside the cement 30 and/or provide power to the chips. In some embodiments, the low-frequency electromagnetic waves may be equal to or below 1 KHz, which allows the waves to pass through the casing 40. The main transceiver 60 may also be linked to the surface device 80 to allow communication between the chips 20 and surface device. In some embodiments, chips 20 may be equipped with small batteries for storing power, and/or energy harvesting devices that collect energy from the formation 70, casing 40, wellbore 50, or main transceiver 60 through vibration or thermal mechanisms. As a nonlimiting example, the energy harvesting device may include a piezoelectric device to convert vibration to electric energy.

In some embodiments, chips 20 are self-powered and do not require external power. In some embodiments, chip 20 can communicate with each-other and form a communication network. This communication network may allow data to be transferred between the chips in the network or other nearby devices. As such, in some embodiments, the need for a main transceiver 60 may be obviated, as the chips 20 can communicate with each-other and transmit the information up to a receiving device 80 at the surface.

In some embodiments, the chips 20 may be complex permittivity sensing chips that comprise a complete electromagnetic impedance sensor for measuring complex permittivity in a region near the chip. In some embodiments, the chips may comprise energy-harvesting circuits, a piezoelectric component for harvesting the energy of ultrasonic waves transmitted by a source (e.g. main transceiver 60) inside the wellbore 50, or a thermal component for harvesting thermal energy from the surround environment.

As a nonlimiting example, a sonic or ultrasonic source (e.g. main transceiver 60) inside the wellbore may communicate with the chips 20, provides energy, or a combination thereof. The chips 20 may convert the ultrasonic waves to an electrical energy. The chips 20 measure the electromagnetic impedance of their surrounding materials to gather data on the surrounding materials, such as the cement 30. The chip 20 may transmit the measured data back to a receiver (e.g. main transceiver 60) inside the casing 40. In addition to sonic and ultrasonic waves (or as an alternative solution), the energy transfer from the main transceiver 60 inside the wellbore 50 to the chips 20 outside of the casing 40, as well as the wireless communication between the main transceiver and the chips can be performed using extremely low-frequency electromagnetic waves (below 1 KHz). By utilizing low frequency electromagnetic waves, the waves can pass through the metal casing 40 and allow communication between the main transceiver 60 and the chips.

In addition to monitoring the quality of cement, various properties of the cement or reservoir such as local electrical permittivity, local magnetic permeability, temperature, pressure, pH, local NMR spectrum, local ESR spectrum, local florescence response, local porosity, and/or local permeability, can be measured using the dispersed integrated chips 20 in the cement 30. The measured data may be transferred to the main transceiver 60 inside the wellbore 50 through electromagnetic waves or sonic waves.

Figure 2:
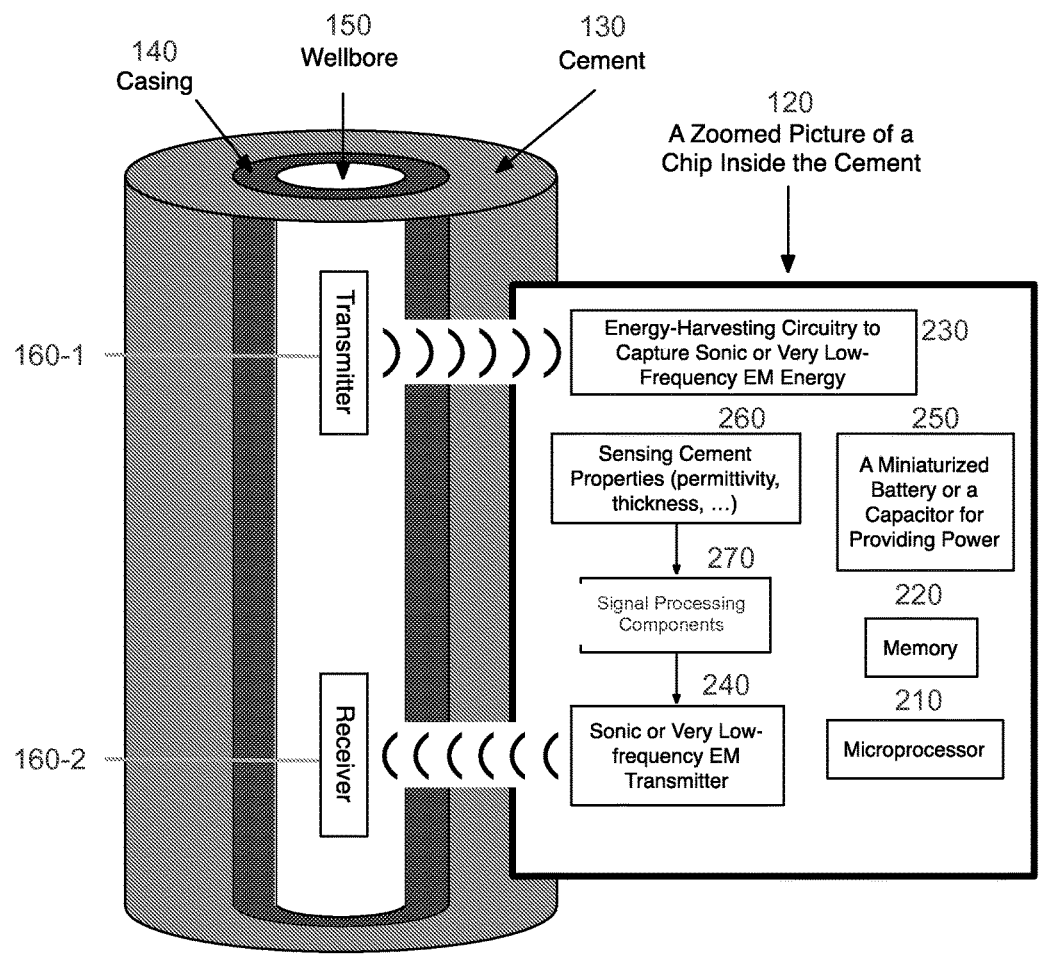
FIG. 2 is an illustrative embodiment of an integrated chip.

FIG. 2 is an illustrative example of components of an integrated chip 120 embedded in the cement 130 for monitoring the properties of the cement. The integrated chips 120 may be dispersed into cement 130 through the process of mixing with the cement and injection into the formation. The number and separation of ICs 120 dispersed into the cement 130 will depend on desired resolution and/or accuracy. Increasing the density or concentration of ICs 120 in the concrete 130 will increase resolution and accuracy of the system. As noted previously, the cement may surround casing 140. Further, a transmitter 160-1 and receiver 160-2 (or a transceiver) may be positioned in the wellbore 150.

Each integrated chip 120 may provide a processor 210, memory 220, receiver 230, transmitter 240, energy-harvesting circuits and/or power source 250, and an optical, infrared, ultrasound and/or MEMS sensor 260 or the like (e.g. for detecting porosity, permeability, local DC or AC magnetic field, local DC or AC electric field, local electrical permittivity, local magnetic permeability, temperature, pressure, pH, local NMR spectrum, local ESR spectrum, local florescence response, etc.). In some embodiments, sensor 260 may include sensor(s) for measuring electric, magnetic, and/or other properties. In some embodiments, the electrical and magnetic properties may be utilized to detect or measure cement setting/curing, cracks inside the cement, local electrical permittivity, local magnetic permeability, local NMR response, local ESR response, local porosity, local permeability, or gas leaks. In some embodiments, sensor 260 may include component(s) for measuring temperature, pressure, pH or the like. Each integrated chip 120 may also provide various signal processing components 270, such as a baseband circuit, amplitude and/or phase modulator, ADC and DAC, voltage controlled oscillator, frequency synthesizer, or the like.

As shown in FIG. 2, the following discussion of the components of the system provide and illustrative nonlimiting example of operation of the system. A transmitter 160-1 may be provided inside the wellbore. This transmitter 160-1 is used to send ultrasonic waves, low-frequency electromagnetic waves, or a combination thereof to the chip(s) 120. These ultrasonic and/or electromagnetic waves can be utilized to communicate data and/or to power the chips 120. A receiver 160-2 may also be provided inside the wellbore. This receiver 160-2 is used to pick-up the signals radiated from the chips 120 through ultrasonic waves or low-frequency electromagnetic waves, thereby allowing the receiver to receive data from the chip(s). As discussed previously, in some embodiments, the transmitter 160-1 and receiver 160-2 may be provided by a main transceiver.

Each chip 120 may provide a receiver 230 for receiving external sonic, ultrasonic, or electromagnetic signals, such as from transmitter 160-1. The receiver 230 may provide energy harvesting circuitry for the chip 120 that captures energy from the environment and stores it in energy storage 250 inside the chip. In some embodiments, the energy storage 250 may be a capacitor, rechargeable battery, or the like. In some embodiments, this energy can be captured from sonic waves, ultrasonic waves or by low-frequency electromagnetic waves transmitted by the main transmitter 160-1 inside the wellbore 150. In some embodiments, the energy can be captured through vibration generated in the formation, mud, casing 140, or wellbore 150. In some embodiments, the energy can be captured from the thermal sources around the chip 120.

As noted previously, electrical and magnetic properties of the surrounding materials can be determined or calculated based on transmitted and reflected waves. The electrical and magnetic properties may then be utilized to identify the surrounding material(s), as well as to measure various other parameters of the materials (e.g. cement setting/curing, cracks inside the cement, local electrical permittivity, local magnetic permeability, local NMR response, local ESR response, local porosity, local permeability, or gas leaks).

As a nonlimiting example, the cement properties can be sensed through the interaction of electromagnetic waves with the cement 130. The electromagnetic waves are generated by the chip 120. The electromagnetic waves may be reflected by the surrounding cement 130, casing 140, and/or formation, and either the same or another chip 120 may receive the reflected wave. By measuring the amplitude and phase of the electromagnetic waves reflected, the chips 120 can be utilized to identify the surround materials and to determine electric or magnetic properties of the surrounding materials. For example, the dielectric constant of the cement 130 can be calculated by measuring the amplitude and phase of the electromagnetic waves reflected from the cement. With other technologies, it is extremely difficult to penetrate sufficiently deep into the cement to gather such information or data because the signal reflects off of the cement/casing boundary. However, this system overcomes such issues with the use of low-frequency waves and chips 120 embedded in the cement 130.

Sensor 260 may include sensor(s) for measuring various properties, such as electric, magnetic, and/or other properties. The information or data outputted from the sensor 260 can be used to modulate the phase or amplitude of sonic or low-frequency electromagnetic waves, such as with signal processing components 270. The modulated wave is sent by a chip transmitter 240 inside the chip 120 to the main receiver 160-2 inside the wellbore 150. Microprocessor 210 is used to control various components of the chip 120, such as the sensor 260, receiver 230, the transmitter 240, signal processing components 270 or the like. The microprocessor 210 stores the information on a memory 220 inside the chip 120. Miniaturized battery or capacitor 250 may be used to store energy and provide power to the chip 120.

The energy-harvesting circuitry 230 may be utilized to gather energy from an external source. In some embodiments, energy-harvesting circuitry 230 may include a piezoelectric component for harvesting the energy of ultrasonic waves transmitted by a source inside the wellbore 150. This ultrasonic source provided by the main transceiver 160-2 inside the wellbore may also be used to communicate with the chip 120 inside the cement 130.

In some embodiments, the complex permittivity sensing chips 120 may comprise a complete electromagnetic impedance sensor 260. The sensor 260 may comprise an EM transmitter and receiver that allow the sensor to transmit waves and received reflected signals that are utilized to analyze the surrounding environment. The chip 130 may measure the electromagnetic impedance of surrounding materials by emitting electromagnetic waves and detecting reflected electromagnetic waves. The sensor 260 may also allow other information, such as cracks inside the cement, local DC or AC magnetic field, local DC or AC electric field local NMR spectrum, local ESR spectrum, local electrical permittivity, local magnetic permeability, local florescence response, porosity, permeability, or gas leaks, such as methane, $CO_2$, and $H_2S$. In some embodiments, sensor 260 may include components that allow the sensor to measure temperature, pressure, pH, or the like.

The relative permittivity or dielectric constant of the cement and other surrounding materials can be calculated by measuring the reflection coefficient of the electromagnetic waves. The relative permittivity or dielectric constant can be utilized to identify the materials and/or determine properties of the materials. The reflection coefficient is the ratio of the reflected wave to the incident wave. For example, if a planar electromagnetic wave propagates from medium 1 to medium 2 in a direction normal to the boundary of these two media, the ratio of the reflected electric field to the incident electric field, which is called the reflection coefficient and can be calculated from the following equation:

$$\text{Reflection coefficient} = (\eta_2 - \eta_1)/(\eta_2 + \eta_1).$$

In the equation above, $\eta_1$ is the square-root of the ratio of magnetic permeability of medium 1 to its electrical permittivity. $\eta_2$ is the square-root of the ratio of magnetic permeability of a medium 2 to its electrical permittivity. This relationship is shown in the following equations:

$$\eta_1 = (\text{magnetic permeability of medium 1/electrical permittivity of medium 1})^{0.5}$$

$$\eta_2 = (\text{magnetic permeability of medium 2/electrical permittivity of medium 2})^{0.5}$$

By analyzing the abovenoted reflection coefficient data, various properties of the cement that may be of interest may be determined, such as, but not limited to, the quality of the cement, bonding quality with the casing, completion of curing, or the like. The position of points of interest, such as where poor quality cement, poor bonding with casing, or incomplete curing exist, can be determined in accordance with position of the chip 120 and time between the transmittal and reflection of the wave. Reflected wave data corresponding to points of interest can be identified by a position of the chip 120 near a point of interest and the time between transmittal and reflection of waves. Once reflected wave data corresponding to a point of interest is identified, the reflected wave data corresponding to the point of interest can be analyze to evaluate various properties of corresponding materials, such as the material present, the state of the material, whether impurities are present, whether gaps are present, or the like.

As a nonlimiting example, reflection wave data corresponding to a position near the interface between the casing 140 and cement 130 may be evaluated for bonding quality. The interface can be determined by finding reflection wave data that shows a transition between steel (or other casing material) and the cement. The reflection wave data may indicate poor bonding quality between the cement 130 and casing 140 when the corresponding reflection coefficient data indicates that gaps, bubbles, cracks impurities, or the like are present inside the cement or between the cement 130 and casing 140. Similarly, in other nonlimiting examples, reflection wave data corresponding to any other regions of cement can analyze. For example, reflection wave data for a region may indicate poor cement quality when the reflection wave data that indicates, cracks, bubbles, impurities, or the like are present. Further, reflection wave data for a region may indicate the curing stage of the cement, as the dielectric constant may indicate humidity or water content.

As another nonlimiting example, it may be desirable to determine a thickness of the cement. A sensor 120 corresponding to the height of a position of interest may be identified so that reflection wave data corresponding to that height can be gathered. By analyzing the reflected waves detected at the corresponding height, two points of interests can be identified where reflection coefficient data changes to indicate a change in material. These two points of interests may indicate a first position where the steel of the well casing 140 transitions to cement 130 and a second position where the cement 130 transitions into the formation. The reflection wave data corresponding to these two points of interest can be analyzed to determine the time between transmittal and reflection of corresponding waves. From this time information, the positions of the two points of interests can be determined, and with the position information on the start and end points of the cement, the thickness of the cement 130 near the chip 120 can easily be determined.

Further, the chip 120 may transmit the measured data back to a receiver 160-2 of the main transceiver inside the casing 140, thereby allowing the data to be provided to a surface device or the like. In addition to sonic and ultrasonic waves (or as an alternative solution), the energy transfer from the main transceiver inside the wellbore to the chips outside of the casing, as well as the wireless communication between the main transceiver and the chips, can be performed using extremely low-frequency electromagnetic waves (below 1 KHz), which can pass through the casing without much attenuation. These low frequency electromagnetic waves can pass through the metal casing.

In addition to monitoring the quality of cement, various properties of the cement or reservoir such as cracks inside the cement, local electrical permittivity, local magnetic permeability, temperature, pressure, pH, local NMR spectrum, local ESR spectrum, local florescence response, local porosity, local permeability, gas leaks such as methane, $CO_2$, or $H_2S$, can be measured using the dispersed integrated chips in the cement. The measured data may be transferred to the main transceiver inside the wellbore through electromagnetic waves or sonic waves.

Embodiments described herein are included to demonstrate particular aspects of the present disclosure. It should be appreciated by those of skill in the art that the embodiments described herein merely represent exemplary embodiments of the disclosure. Those of ordinary skill in the art should, in light of the present disclosure, appreciate that many changes can be made in the specific embodiments described and still obtain a like or similar result without departing from the spirit and scope of the present disclosure. From the foregoing description, one of ordinary skill in the art can easily ascertain the essential characteristics of this disclosure, and without departing from the spirit and scope thereof, can make various changes and modifications to adapt the disclosure to various usages and conditions. The embodiments described hereinabove are meant to be illustrative only and should not be taken as limiting of the scope of the disclosure.

What is claimed is:

1. A system for monitoring cement quality in a cased well environment, the system comprising:
   a well casing;
   cement surrounding the well casing;
   a plurality of chips dispersed in the cement, wherein each of the plurality of chips comprises
   a sensor with a chip transmitter for emitting a transmitted wave and a chip receiver for detecting a reflected wave, and
   a processor for calculating electrical and magnetic properties based on the reflected wave,
   wherein the electrical and magnetic properties are utilized to determine a material present, and wherein the material comprises at least one of the cement, formation, casing material, water, and impurities;
   a borehole transceiver positioned within the well casing, wherein the borehole transceiver communicates with the plurality of chips; and
   wherein the plurality of chips are dispersed in the cement prior to curing, and the plurality of chips and the cement are injected between the formation and the well casing to cure.

2. The system of claim 1, wherein gathered data from the plurality of chips is transmitted to the borehole transceiver via sonic, ultrasonic, or electromagnetic waves.

3. The system of claim 2, wherein the gathered data from the plurality of chips is transmitted through the well casing utilizing low-frequency electromagnetic waves with a frequency of 100 kHz or less.

4. The system of claim 1, wherein the transmitted wave and the reflected wave are utilized to measure a reflection coefficient $(\eta_2-\eta_1)/(\eta_2+\eta_1)$, where $$\eta_1 = \sqrt{\frac{\text{magnetic permeability of medium 1}}{\text{electric permittivity of medium 1}}}$$

$$\eta_2 = \sqrt{\frac{\text{magnetic permeability of medium 2}}{\text{electric permittivity of medium 2}}},$$

and the reflection coefficient is utilized to calculate the dielectric constant.

5. The system of claim 1, wherein the sensor is used to measure or detect cement setting/curing, cracks inside the cement, local electrical permittivity, local magnetic permeability, temperature, pressure, pH, local NMR spectrum, local ESR spectrum, local florescence response, local porosity, local permeability, or gas leaks.

6. The system of claim 1, wherein each of the plurality of chips further comprise: a battery or capacitor for providing power; and a memory for storing reflection wave data gathered by each of the plurality of chips.

7. The system of claim 1, wherein each of the chips further comprise:
   a signal processor coupled to the sensor, wherein the signal processor calculates a phase or amplitude of output data from the sensor in accordance with a value detected by the sensor.

8. The system of claim 1, wherein reflection wave data corresponding to a plurality of positions for one of the plurality of chips is gathered,
   a first material-transition position where the well casing meets the cement is located by analyzing the reflection wave data for a first change in the dielectric constant,
   a second material-transition position where the cement ends is located by analyzing the reflection wave data for a second change in the dielectric constant, and a thickness of the cement is calculated in accordance with the first and second material transition positions.

9. The system of claim 1, wherein the system determines whether the cement has fully cured based on the dielectric constant calculated.

10. The system of claim 1, wherein the system gathers reflection wave data corresponding to positions near an interface between the well casing and the cement, and dielectric constant data corresponding to the reflection wave data is analyzed to determine whether cracks, gaps, bubbles, or the impurities are present near the interface.

11. The system of claim 1, wherein each of the plurality of chips further comprises energy-harvesting circuitry for harvesting energy from sonic, ultrasonic, or electromagnetic waves.

12. The system of claim 11, wherein the energy-harvesting circuitry is piezoelectric.

13. A method for monitoring cement in a cased well environment, the method comprising:
   emitting an transmitted wave from one of a plurality of chips dispersed in cement surrounding a well casing;
   detecting a reflected wave with the one of the plurality of chips; and
   calculating a dielectric constant based on the reflected wave, wherein the dielectric constant is utilized to determine a material present at a location, wherein the material comprises at least one of the cement, formation, casing material, water, and impurities.

14. The method of claim 13, further comprising:
   gathering reflection wave data for a plurality of positions with the one of the plurality of chips;
   locating a first material-transition position where the well casing meets the cement by analyzing the reflection wave data for a first change in the dielectric constant;
   locating a second material-transition position where the cement ends by analyzing the reflection wave data for a second change in the dielectric constant; and
   calculating a thickness of the cement is in accordance with the first and second material transition positions.

15. The method of claim 13 further comprises determining whether the cement has fully cured based on the dielectric constant calculated.

16. The method of claim 13 further comprising:
   gathering reflected wave data corresponding to positions near an interface between the well casing and the cement; and
   analyzing the dielectric constant for the positions to determine whether cracks, gaps, bubbles, or the impurities are present near the interface.

17. The method of claim 13, further comprises:
   injecting the cement between the formation and the well casing to cure, and
   wherein at least one chip of the plurality of chips is dispersed in the cement prior to curing.

18. The method of claim 13, further comprises transmitting gathered data from the one of the plurality of chips through the well casing to a borehole receiver positioned in a wellbore via sonic, ultrasonic, or electromagnetic waves.

19. The method of claim 18, wherein the gathered data is transmitted through the casing through the casing utilizing low-frequency electromagnetic waves with a frequency of 100 kHz or less.

20. The method of claim 13, wherein the transmitted wave and the reflected wave are utilized to measure a reflection coefficient $(\eta_2-\eta_1)/(\eta_2+\eta_1)$, where $$\eta_1 = \sqrt{\frac{\text{magnetic permeability of medium 1}}{\text{electric permittivity of medium 1}}}$$

$$\eta_2 = \sqrt{\frac{\text{magnetic permeability of medium 2}}{\text{electric permittivity of medium 2}}},$$

and the reflection coefficient is utilized to calculate the dielectric constant.

21. The method of claim 13, wherein the plurality of chips measure or detect cement setting/curing, cracks inside the cement, local porosity, or local electrical permittivity.

22. The method of claim 13 further comprises calculating a phase or amplitude of output data from the sensor in accordance with a value detected by the sensor.

23. The method of claim 13 further comprises harvesting energy from sonic, ultrasonic, or electromagnetic waves with each of the plurality of chips.

24. The method of claim 23, wherein harvesting is achieved with a piezoelectric component.

25. A system for monitoring cement quality in a cased well environment, the system comprising:
   a well casing;
   cement surrounding the well casing;
   a plurality of chips dispersed in the cement, wherein each of the plurality of chips comprises
   a sensor with a chip transmitter for emitting a transmitted wave and a chip receiver for detecting a reflected wave, and
   a processor for calculating electrical and magnetic properties based on the reflected wave,
   wherein the electrical and magnetic properties are utilized to determine a material present, and wherein the material comprises at least one of the cement, formation, casing material, water, and impurities;
   a borehole transceiver positioned within the well casing, wherein the borehole transceiver communicates with the plurality of chips; and
   wherein the transmitted wave and the reflected wave are utilized to measure a reflection coefficient $(\eta_2-\eta_1)/(\eta_2+\eta_1)$, where $$\eta_1 = \sqrt{\frac{\text{magnetic permeability of medium 1}}{\text{electric permittivity of medium 1}}}$$

$$\eta_2 = \sqrt{\frac{\text{magnetic permeability of medium 2}}{\text{electric permittivity of medium 2}}},$$

and the reflection coefficient is utilized to calculate the dielectric constant.

26. A system for monitoring cement quality in a cased well environment, the system comprising:
   a well casing;
   cement surrounding the well casing;
   a plurality of chips dispersed in the cement, wherein each of the plurality of chips comprises
   a sensor with a chip transmitter for emitting a transmitted wave and a chip receiver for detecting a reflected wave, and
   a processor for calculating electrical and magnetic properties based on the reflected wave,
   wherein the electrical and magnetic properties are utilized to determine a material present, and wherein the material comprises at least one of the cement, formation, casing material, water, and impurities;

a borehole transceiver positioned within the well casing, wherein the borehole transceiver communicates with the plurality of chips; and wherein reflection wave data corresponding to a plurality of positions for one of the plurality of chips is gathered, a first material-transition position where the well casing meets the cement is located by analyzing the reflection wave data for a first change in the dielectric constant, a second material-transition position where the cement ends is located by analyzing the reflection wave data for a second change in the dielectric constant, and a thickness of the cement is calculated in accordance with the first and second material transition positions.

27. A system for monitoring cement quality in a cased well environment, the system comprising:

a well casing;

cement surrounding the well casing;

a plurality of chips dispersed in the cement, wherein each of the plurality of chips comprises a sensor with a chip transmitter for emitting a transmitted wave and a chip receiver for detecting a reflected wave, and a processor for calculating electrical and magnetic properties based on the reflected wave, wherein the electrical and magnetic properties are utilized to determine a material present, and wherein the material comprises at least one of the cement, formation, casing material, water, and impurities;

a borehole transceiver positioned within the well casing, wherein the borehole transceiver communicates with the plurality of chips; and wherein the system determines whether the cement has fully cured based on the dielectric constant calculated.

28. A system for monitoring cement quality in a cased well environment, the system comprising:

a well casing;

cement surrounding the well casing;

a plurality of chips dispersed in the cement, wherein each of the plurality of chips comprises a sensor with a chip transmitter for emitting a transmitted wave and a chip receiver for detecting a reflected wave, and a processor for calculating electrical and magnetic properties based on the reflected wave, wherein the electrical and magnetic properties are utilized to determine a material present, and wherein the material comprises at least one of the cement, formation, casing material, water, and impurities;

a borehole transceiver positioned within the well casing, wherein the borehole transceiver communicates with the plurality of chips; and wherein the system gathers reflection wave data corresponding to positions near an interface between the well casing and the cement, and dielectric constant data corresponding to the reflection wave data is analyzed to determine whether cracks, gaps, bubbles, or the impurities are present near the interface.

* * * * *